US011890641B2

(12) United States Patent
Katayama

(10) Patent No.: US 11,890,641 B2
(45) Date of Patent: Feb. 6, 2024

(54) MASKING MEMBER, AND METHOD FOR COATING PIPE INNER CIRCUMFERENTIAL SURFACE USING SAME

(71) Applicant: MITSUBISHI HEAVY INDUSTRIES, LTD., Tokyo (JP)

(72) Inventor: Tetsuya Katayama, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 191 days.

(21) Appl. No.: 17/429,985

(22) PCT Filed: Mar. 23, 2020

(86) PCT No.: PCT/JP2020/012687
§ 371 (c)(1),
(2) Date: Aug. 11, 2021

(87) PCT Pub. No.: WO2020/209041
PCT Pub. Date: Oct. 15, 2020

(65) Prior Publication Data

US 2022/0143648 A1 May 12, 2022

(30) Foreign Application Priority Data

Apr. 8, 2019 (JP) ................................ 2019-073574

(51) Int. Cl.

| | |
|---|---|
| ***B05D 1/32*** | (2006.01) |
| ***B05B 12/24*** | (2018.01) |
| ***B05D 7/22*** | (2006.01) |
| ***B05B 12/22*** | (2018.01) |
| ***B05C 21/00*** | (2006.01) |

(52) U.S. Cl.
CPC ................ *B05D 1/32* (2013.01); *B05B 12/24* (2018.02); *B05C 21/005* (2013.01); *B05D 7/225* (2013.01)

(58) Field of Classification Search
None
See application file for complete search history.

(56) References Cited

U.S. PATENT DOCUMENTS 3,667,988 A * 6/1972 Horiki ..................... B05B 12/20 118/504
4,822,650 A * 4/1989 Horiki ..................... B05B 12/20 428/36.5

(Continued)

FOREIGN PATENT DOCUMENTS

JP H11169764 A 6/1999
JP H11226464 A 8/1999

(Continued)

OTHER PUBLICATIONS

International Search Report and Written Opinion of International Application No. PCT/JP2020/012687 dated Jun. 16, 2020; 12pp.

*Primary Examiner* — Jethro M. Pence
(74) *Attorney, Agent, or Firm* — KANESAKA BERNER AND PARTNERS LLP

(57) ABSTRACT

A masking member used to coat a pipe inner circumferential surface of a vent stringer, wherein the masking member comprises: a sponge for blocking a pipe internal space of the vent stringer, the sponge having an outer circumferential surface capable of contacting the pipe inner circumferential surface; and a support member for supporting the sponge.

9 Claims, 12 Drawing Sheets

(56) References Cited

U.S. PATENT DOCUMENTS

| | | | | | |
|---|---|---|---|---|---|
| 4,844,285 | A * | 7/1989 | Horiki | B05B 12/26 | |
| | | | | 220/DIG. 19 | |
| 4,879,158 | A * | 11/1989 | Horiki | B05B 12/26 | |
| | | | | 118/504 | |
| 5,193,716 | A * | 3/1993 | Horiki | B05B 12/26 | |
| | | | | 118/504 | |
| 7,516,534 | B2 * | 4/2009 | Easterbrook | B21J 15/04 | |
| | | | | 29/523 | |
| 9,061,305 | B1 * | 6/2015 | Martinez | B05B 12/20 | |
| 10,259,596 | B2 * | 4/2019 | Stinson | B64F 5/10 | |
| 2016/0136673 | A1 * | 5/2016 | Stinson | B05B 12/26 | |
| | | | | 118/505 | |

FOREIGN PATENT DOCUMENTS

| | | | |
|---|---|---|---|
| JP | H11276949 | A | 10/1999 |
| JP | 2000288438 | A | 10/2000 |
| JP | 2001334185 | A | 12/2001 |
| JP | 2004202985 | A | 7/2004 |
| JP | 2005021859 | A | 1/2005 |
| JP | 2016059892 | A | 4/2016 |

* cited by examiner

MASKING MEMBER, AND METHOD FOR COATING PIPE INNER CIRCUMFERENTIAL SURFACE USING SAME

RELATED APPLICATIONS

The present application is a National Phase of International Application Number PCT/JP2020/012687 filed Mar. 23, 2020, and claims priority from Japan Application Number 2019-073574 filed Apr. 8, 2019.

TECHNICAL FIELD

The present invention relates to a masking member and a method for coating a pipe inner peripheral surface by using the same.

This application claims the priority of Japanese Patent Application No. 2019-073574 filed in Japan on Apr. 8, 2019, the content of which is incorporated herein by reference.

BACKGROUND ART

When coating is performed, in a case where a coating object has a coating portion to be coated and a non-coating portion not to be coated, the non-coating portion is covered with a masking material. The masking material is removed after a coating material adheres to the coating portion by spraying or applying the coating material to the coating object. In this manner, only the coating portion is coated, and the non-coating portion is not coated.

For example, PTL 1 discloses a masking member having a configuration including a disk having an outer diameter substantially equal to an inner diameter of a pipe end opening surface, and a cylindrical rim body integrally provided on an outer peripheral edge of the disk and in close contact with a pipe end inner peripheral surface. The disk and the rim body are made of a rubber-like elastic body. Masking for coating configured in this way is fitted into an opening of a pipe end when an outer surface of a pipe is coated. In this manner, a coating material adheres only to the outer surface of the pipe, and does not adhere to an inner surface of the pipe.

CITATION LIST

Patent Literature

[PTL 1] Japanese Unexamined Patent Application Publication No. H11-169764

SUMMARY OF INVENTION

Technical Problem

Incidentally, when only a portion of an inner peripheral surface of a hollow pipe needs to be coated, a masking member is inserted into the hollow pipe, and the portion of the inner peripheral surface is coated from one side of the masking member in a pipe axis direction of the hollow pipe. In this manner, on the inner peripheral surface of the hollow pipe, one side in the pipe axis direction with respect to the masking member becomes a coating portion which is coated, and the other side with respect to the masking member becomes a non-coating portion which is not coated.

According to a configuration disclosed in PTL 1, the masking member is fitted into the opening of the pipe end, and is not inserted into the hollow pipe. In addition, even when the masking member disclosed in PTL 1 needs to be inserted into the hollow pipe, the disk and the rim body which form the masking member are made of a rubber material. Consequently, frictional resistance increases between an outer peripheral surface of the disk and the rim body and the inner peripheral surface of the hollow pipe. Therefore, in some cases, the masking member disclosed in PTL 1 may be less likely to be inserted into the hollow pipe.

An object of the present invention is to provide a masking member which is likely to be inserted into a hollow pipe, and a method for coating a pipe inner peripheral surface by using the same.

Solution to Problem

According to a first aspect, there is provided a masking member used to coat a pipe inner peripheral surface of a hollow pipe. The masking member includes a sponge that closes a pipe inner space of the hollow pipe, and has an outer peripheral surface which comes into contact with the pipe inner peripheral surface, and a support member that supports the sponge.

According to this aspect, the masking member closes the pipe inner space of the hollow pipe by using the masking member including the sponge and the support member. In this manner, when the pipe inner peripheral surface is coated from one side in the pipe axis direction of the hollow pipe with respect to the masking member, it is possible to suppress a possibility that a coating material may reach the other side in the pipe axis direction. Therefore, a coating portion which is coated is formed on one side in the pipe axis direction with respect to the masking member, and a non-coating portion which is not coated is formed on the other side in the pipe axis direction.

In addition, the sponge comes into contact with the pipe inner peripheral surface. Accordingly, compared to a case where a rubber material comes into contact with the pipe inner peripheral surface, frictional resistance generated between the masking member and the pipe inner peripheral surface decreases.

Therefore, the masking member is likely to be inserted into the hollow pipe.

In addition, according to a second aspect of the masking member, in the masking member according to the first aspect, the sponge may include a first sponge layer and a second sponge layer having meshes coarser than those of the first sponge layer sequentially from a side closer to a coating portion in a pipe axis direction of the hollow pipe.

According to this aspect, the second sponge layer having coarser meshes is provided. In this manner, the frictional resistance against the pipe inner peripheral surface can be further suppressed.

In addition, according to a third aspect of the masking member, in the masking member according to the first or second aspect, the outer peripheral surface of the sponge may come into contact with the pipe inner peripheral surface over an entire periphery.

According to this aspect, the sponge is brought into contact with the pipe inner peripheral surface over the entire periphery. In this manner, a gap between the masking member and the pipe inner peripheral surface can be reliably closed, and more reliable masking can be performed.

In addition, according to a fourth aspect of the masking member, in the masking member according to any one of the first to third aspects, the outer peripheral surface of the sponge may be parallel to the pipe inner peripheral surface.

According to this aspect, the sponge and the pipe inner peripheral surface are in contact with each other over a constant length along the pipe axis direction. In this manner, more reliable masking can be performed.

In addition, according to a fifth aspect of the masking member, in the masking member according to any one of the first to fourth aspects, the sponge may be attachable to and detachable from the support member.

According to this aspect, the masking member can be repeatedly used by replacing the sponge.

In addition, according to a sixth aspect of the masking member, in the masking member according to any one of the first to fifth aspects, the sponge may have a supported surface facing a pipe axis direction of the hollow pipe. The support member may have a support surface facing the supported surface in the pipe axis direction.

According to this aspect, the sponge is restricted in the pipe axis direction. In this manner, for example, when the masking member is inserted into and removed from the hollow pipe, it is possible to suppress a possibility that the sponge may deviate from the support member in the pipe axis direction.

In addition, according to a seventh aspect of the masking member, in the masking member according to the sixth aspect, the sponge may have a through-hole penetrating in the pipe axis direction. The support member may include a support shaft portion inserted into the through-hole of the sponge, a first support plate portion provided on one end side of the support shaft portion in the pipe axis direction, and formed along a first supported surface of the sponge which faces a first side in the pipe axis direction, and a second support plate portion provided on the other end side of the support shaft portion in the pipe axis direction, and formed along a second supported surface of the sponge which faces a second side in the pipe axis direction.

According to this aspect, movement of the sponge in a radial direction of the hollow pipe is restricted by the support shaft portion inserted into the through-hole. In addition, the sponge is pinched between the first support plate portion and the second support plate portion. In this manner, the movement of the sponge in the pipe axis direction is restricted. In this way, the support member can reliably hold the sponge.

In addition, according to an eighth aspect of the masking member, in the masking member according to the seventh aspect, the second support plate portion may be attachable to and detachable from the support shaft portion.

According to this aspect, an operator can easily attach and detach the sponge to and from the support member by removing the second support plate portion from the support shaft portion.

In addition, according to a ninth aspect of the masking member, in the masking member according to any one of the first to eighth aspects, the support member may further include an attachable and detachable grip.

According to this aspect, the operator can easily install the masking member inside the hollow pipe and can remove the masking member from the inside of the hollow pipe by gripping the grip. In addition, since the grip is attachable and detachable, only the grip can be replaced when the grip becomes dirty with the coating material.

In addition, according to a tenth aspect, there is a method for coating a pipe inner peripheral surface by using the masking member according to any one of the first to ninth aspects. The method for coating the pipe inner peripheral surface includes a step of providing the masking member at a position separated from an opening of the hollow pipe by a determined dimension in a pipe axis direction of the hollow pipe, and a step of coating the pipe inner peripheral surface from the opening, and a step of removing the masking member from the opening of the hollow pipe.

According to this aspect, the pipe inner peripheral surface is coated from the opening side of the hollow pipe in a state where the masking member is installed inside the hollow pipe. In this manner, only the pipe inner peripheral surface on the opening side with respect to the masking member can be coated. In addition, in the masking member, the sponge comes into contact with the pipe inner peripheral surface. Accordingly, the masking member can be easily moved inside the hollow pipe in the pipe axis direction.

Therefore, the masking member is likely to be inserted into the hollow pipe.

Advantageous Effects of Invention

According to the above-described aspect, the masking member is likely to be inserted into the hollow pipe.

DESCRIPTION OF EMBODIMENTS

Hereinafter, a masking member according to an embodiment of the present invention and a method for coating a pipe inner peripheral surface by using the masking member will be described with reference to FIGS. 1 to 12.

Figure 1:
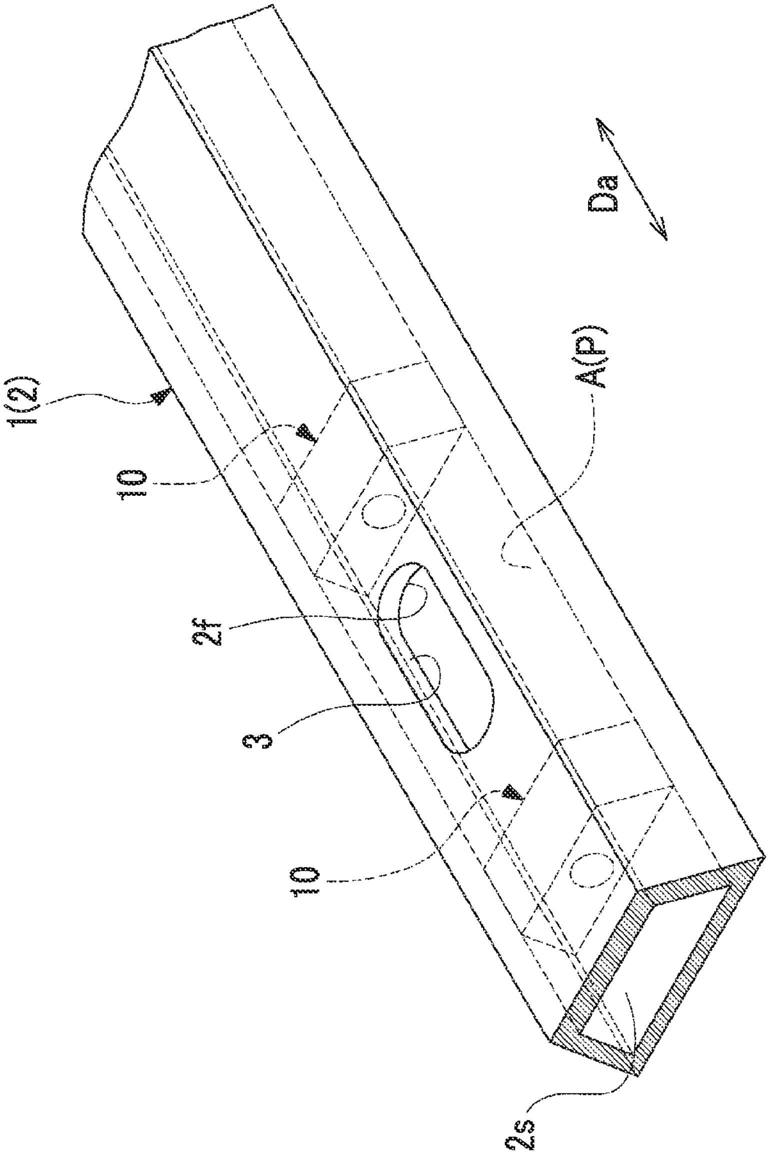
FIG. 1 is a perspective sectional view illustrating a state where a masking member according to an embodiment is disposed in a pipe inner space of a vent stringer serving as a coating object.

FIG. 1 is a perspective sectional view illustrating a state where the masking member according to the embodiment is disposed in a pipe inner space of a vent stringer serving as a coating object.

As illustrated in FIG. 1, for example, a coating object 1 to be coated by using a masking member 10 according to the present embodiment is a vent stringer (hollow pipe) 2 provided in a wing of an aircraft (not illustrated). The vent stringer 2 forms a portion of the wing. The vent stringer 2 has a hollow pipe shape continuous with a predetermined pipe axis direction Da. In the present embodiment, a sectional shape of the vent stringer 2 is a trapezoidal shape orthogonal to the pipe axis direction Da. A pipe inner space 2*s* of the vent stringer 2 communicates with a fuel tank (not illustrated) provided in the wing. The vent stringer 2 has an opening 3 through which the pipe inner space 2*s* and an outside of the vent stringer 2 communicate with each other. The opening 3 is formed to penetrate the inside and the outside of the vent stringer 2. In the present embodiment, for example, the opening 3 has an oval shape. For example, the opening 3 is provided with a mechanism (not illustrated) for adjusting a pressure inside a fuel tank in accordance with an air pressure outside the vent stringer 2.

Figure 2:
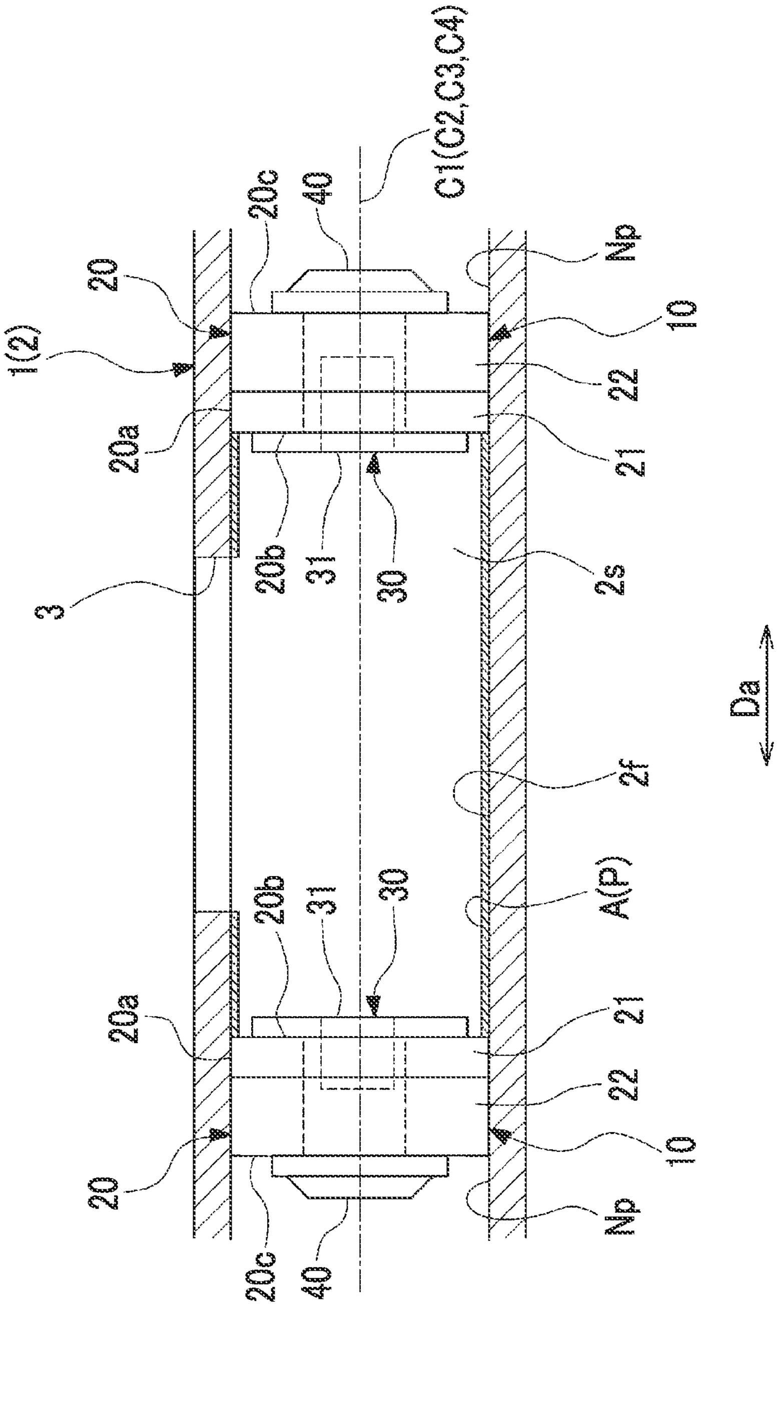
FIG. 2 is a sectional view taken along a pipe axis direction, which illustrates a state where the masking member according to the embodiment is provided on both sides of a region to be coated.

FIG. 2 is a sectional view taken along a pipe axis direction, which illustrates a state where the masking member according to the embodiment is provided on both sides of a region to be coated.

As illustrated in FIG. 2, in the present embodiment, on a pipe inner peripheral surface 2*f* of the vent stringer 2, a predetermined region A extending to both sides in the pipe axis direction Da around the opening 3 is coated. The masking member 10 as described below is used to coat the region A of a portion of the pipe inner peripheral surface 2*f* of the vent stringer 2. The masking members 10 each are disposed on both sides in the pipe axis direction Da of the region A inside the vent stringer 2. Each of the masking members 10 has the same configuration, and has a size that can be inserted into and removed from the pipe inner space 2*s* through the opening 3.

Figure 3:
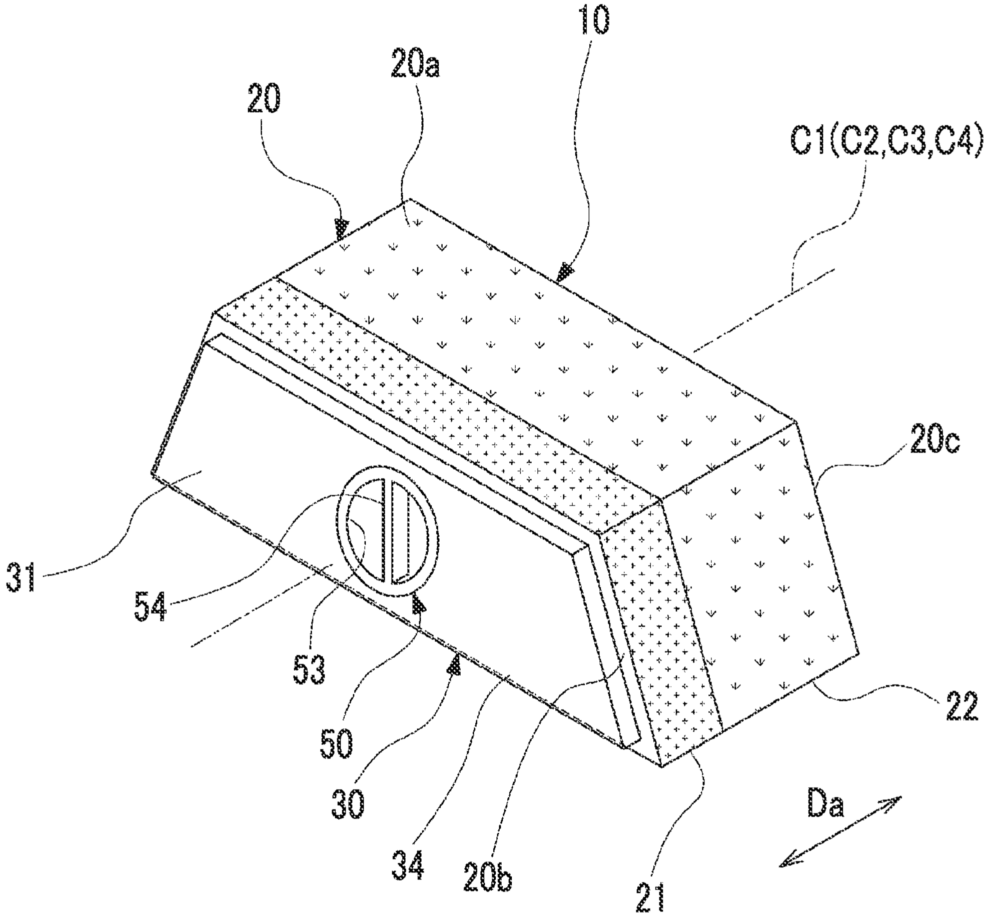
FIG. 3 is a perspective view illustrating the masking member according to the embodiment.
Figure 4:
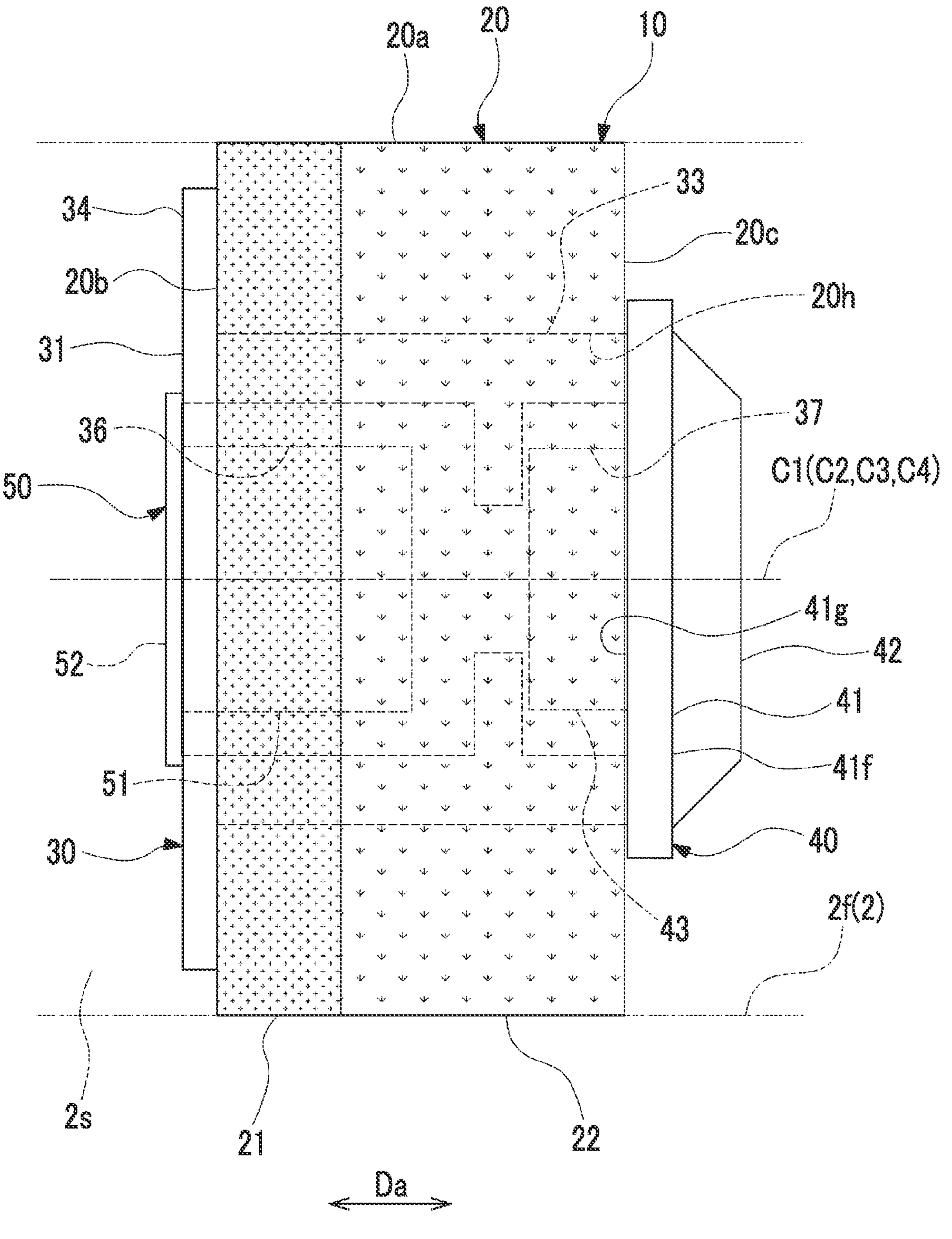
FIG. 4 is a view when the masking member according to the embodiment is viewed in a direction intersecting with a central axis.

FIG. 3 is a perspective view illustrating the masking member according to the present embodiment. FIG. 4 is a view when the masking member according to the present embodiment is viewed in a direction intersecting with a central axis.

As illustrated in FIGS. 2 to 4, the masking member 10 includes a sponge 20 and a support member 30.

The sponge 20 closes the pipe inner space 2*s* of the vent stringer 2. Therefore, in the sponge 20, a sectional shape orthogonal to a central axis C1 is a sectional shape that complements the pipe inner space 2*s* of the vent stringer 2, that is, a trapezoidal shape. The sponge 20 has an outer peripheral surface 20*a* that can come into contact with the pipe inner peripheral surface 2*f*. The outer peripheral surface 20*a* of the sponge 20 can come into contact with the pipe inner peripheral surface 2*f* over an entire periphery. The outer peripheral surface 20*a* of the sponge 20 is parallel to the pipe inner peripheral surface 2*f*.

In addition, the sponge 20 has supported surfaces 20*b* and 20*c* on both sides in a direction of the central axis C1. The supported surfaces 20*b* and 20*c* face the pipe axis direction Da in a state of being disposed inside the pipe inner space 2*s* of the vent stringer 2. The supported surfaces 20*b* and 20*c* each are orthogonal to the direction of the central axis C1. The first supported surface 20*b* faces a first side (left side in FIG. 4) in the direction of the central axis C1 (pipe axis direction Da) in the sponge 20. The second supported surface 20*c* faces a second side (right side in FIG. 4) in the direction of the central axis C1 in the sponge 20.

As illustrated in FIG. 3, the sponge 20 has a through-hole 20*h* penetrating in the direction of the central axis C1 in a central portion of the supported surfaces 20*b* and 20*c*. A support shaft portion 33 of the support member 30 (to be described later) is inserted into the through-hole 20*h*. In the through-hole 20*h*, for example, a sectional shape when viewed in the direction of the central axis C1 is a pentagonal shape in accordance with the support shaft portion 33 (to be described later).

The sponge 20 includes a first sponge layer 21 and a second sponge layer 22. The first sponge layer 21 and the second sponge layer 22 are aligned in the direction of the central axis C1.

For example, as illustrated in FIG. 2, the sponge 20 may include the first sponge layer 21 and the second sponge layer 22 sequentially from a side closer to a coating portion P in the pipe axis direction Da.

For example, as illustrated in FIG. 3, the sponge 20 may include the first sponge layer 21 and the second sponge layer 22 sequentially from the first supported surface 20*b* side toward the second supported surface 20*c* side.

For example, each of the first sponge layer 21 and the second sponge layer 22 may be formed of a sponge material containing a resin material having resistance against the coating material.

The first sponge layer 21 and the second sponge layer are porous bodies which are flexible and have many micropores. The second sponge layer 22 is formed of a sponge material having meshes coarser than those of the first sponge layer 21. Here, the sponge material having coarser meshes indicates that a diameter of the micropore is larger and an aperture ratio is higher than those of the sponge material of the first sponge layer 21.

The support member 30 supports the sponge 20. The sponge 20 is supported by the support member 30 to be attachable and detachable. The support member 30 includes a main member 31, a pressing member 40, and a grip member 50. The support member 30 is disposed inside the pipe inner space 2*s* of the vent stringer 2 while a central axis C2 thereof extends along the pipe axis direction Da.

For example, the main member 31 may be mounted from the first supported surface 20*b* side, and the pressing member 40 may be mounted from the second supported surface 20*c* side.

For example, each member of the support member 30 may be molded by a 3D printer.

Figure 5:
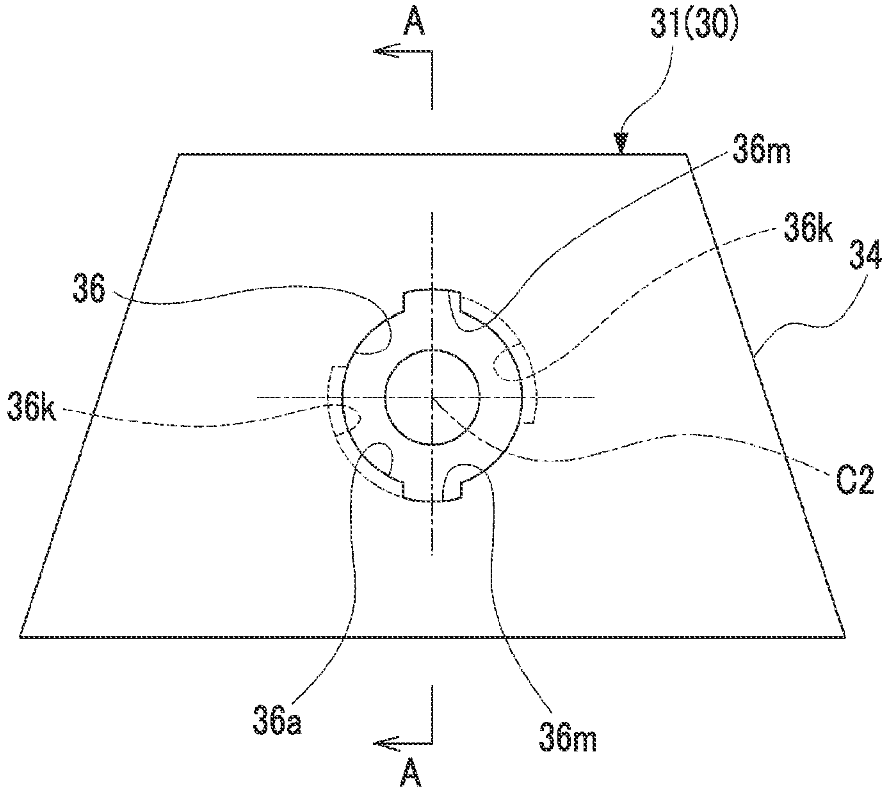
FIG. 5 is a side view when a main member forming a support member of the masking member according to the embodiment is viewed from a first side in a central axis direction.
Figure 6:
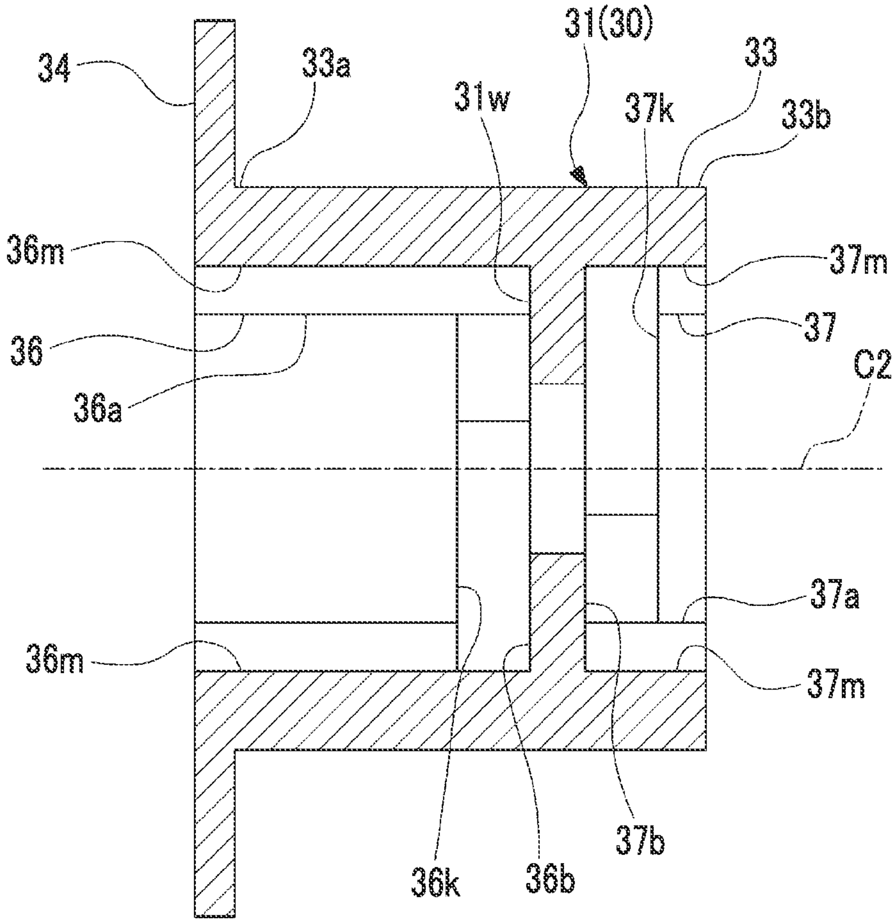
FIG. 6 is a view illustrating the main member according to the embodiment, and is a sectional view taken along line A-A in FIG. 5.
Figure 7:
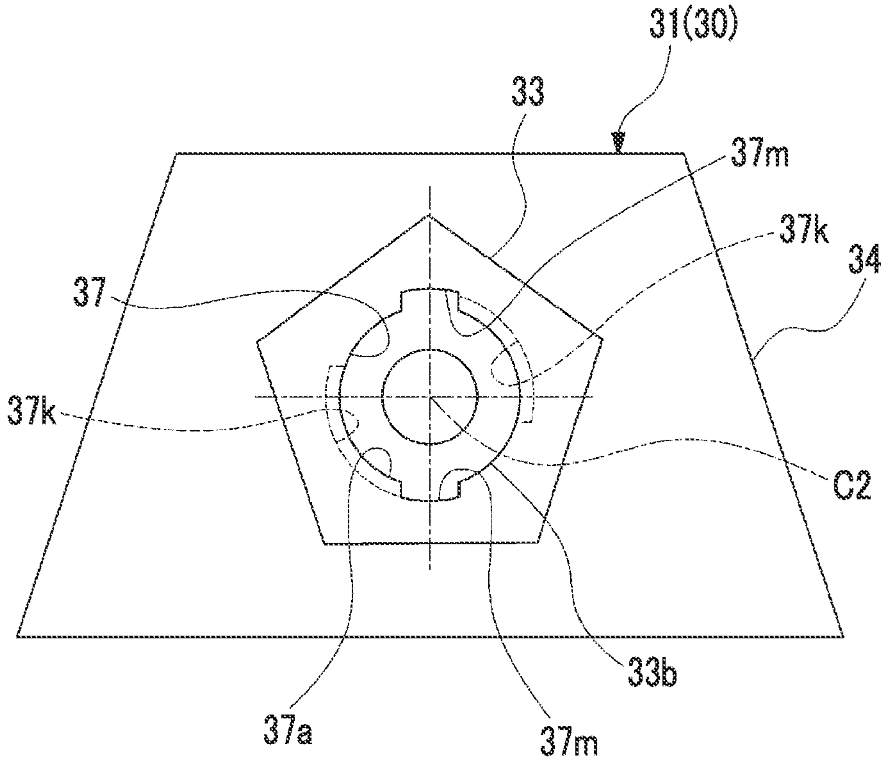
FIG. 7 is a side view when the main member forming the support member of the masking member according to the embodiment is viewed from a second side in the central axis direction.

FIG. 5 is a side view when the main member forming the support member of the masking member according to the present embodiment is viewed from the first side in the central axis direction. FIG. 6 is a view illustrating the main member according to the present embodiment, and is a sectional view taken along line A-A in FIG. 5. FIG. 7 is a side view when the main member forming the support member of the masking member according to the present embodiment is viewed from the second side in the central axis direction.

As illustrated in FIGS. 4 to 7, the main member 31 integrally includes the support shaft portion 33 and a first support plate portion (support surface) 34. The main member 31 is formed of a material harder than that of the sponge 20. For example, the main member 31 is formed of a resin material or a rubber material.

The support shaft portion 33 has a columnar shape extending in the direction of the central axis C2. A sectional shape of the support shaft portion 33 when viewed in the direction of the central axis C2 is a polygonal shape, for example, a pentagonal shape. The support shaft portion 33 can be inserted into and removed from the through-hole 20*h* of the sponge 20. The support shaft portion 33 having a polygonal sectional shape is inserted into the through-hole 20*h* having the sectional shape the same as that of the support shaft portion 33. In this manner, rotation of the sponge 20 is restricted in a circumferential direction around the support shaft portion 33.

The first support plate portion 34 is provided on one end 33*a* side of the support shaft portion 33 in the direction of the central axis C2. As illustrated in FIGS. 3 and 4, the first support plate portion 34 extends along (abuts on) the first supported surface 20*b* of the sponge 20 from the first side in the direction of the central axis C2 (pipe axis direction Da). In the present embodiment, the first support plate portion 34 is formed to be several mm smaller than an outer shape of the sponge 20 when viewed from the first side in the direction of the central axis C2. The first support plate portion 34 is formed along the first supported surface 20*b* of the sponge 20. In this manner, movement of the sponge 20 to the first side in the direction of the central axis C2 is restricted.

As illustrated in FIGS. 4 to 7, the main member 31 has a grip mounting hole 36 and an auxiliary member mounting hole 37.

As illustrated in FIG. 4, the grip member 50 is mounted on the grip mounting hole 36 to be attachable and detachable. As illustrated in FIGS. 4 and 6, the grip mounting hole 36 is recessed from a central portion of the first support plate portion 34 toward the second side in the direction of the central axis C2 (right side in FIGS. 4 and 6).

As illustrated in FIGS. 5 and 6, the grip mounting hole 36 has a pair of guide grooves 36*m* formed on both sides in a radial direction while the central axis of the grip mounting holes 36 is interposed therebetween. Each of the guide grooves 36*m* is recessed outward in the radial direction from an inner peripheral surface 36*a* of the grip mounting hole 36, and is continuously formed in the direction of the central axis C2. A bottom portion 36*b* on the second side in the direction of the central axis C2 of the grip mounting hole 36 has a pair of engagement grooves 36*k* formed on both sides in the radial direction while the center of the grip mounting hole 36 is interposed therebetween. Each of the engagement grooves 36*k* is recessed outward in the radial direction from the inner peripheral surface 36*a*. Each of the engagement grooves 36*k* is continuously formed at a predetermined angle (for example, approximately 90°) in the circumferential direction around the central axis C2 from an end of each of the guide grooves 36*m* on the second side in the direction of the central axis C2.

As illustrated in FIG. 4, the pressing member 40 is mounted on the auxiliary member mounting hole 37 to be attachable and detachable. As illustrated in FIG. 6, the auxiliary member mounting hole 37 is recessed toward the first side (left side in FIG. 6) in the direction of the central axis C2 from the other end 33*b* of the support shaft portion 33 on the second side in the direction of the central axis C2. A partition wall 31*w* orthogonal to the direction of the central axis C2 is formed between a first bottom portion 37*b* of the auxiliary member mounting hole 37 in the direction of the central axis C2 and a bottom portion 36*b* of the grip mounting hole 36.

As illustrated in FIGS. 6 and 7, a pair of guide grooves 37*m* are formed in the auxiliary member mounting holes 37 on both sides in the radial direction while the central axis C2 is interposed therebetween. Each of the guide grooves 37*m* is recessed outward in the radial direction from an inner peripheral surface 37*a* of the auxiliary member mounting hole 37, and is continuously formed in the direction of the central axis C2. The bottom portion 37*b* of the auxiliary member mounting hole 37 has a pair of engagement grooves 37*k* formed on both sides in the radial direction while the center of the auxiliary member mounting hole 37 is interposed therebetween. Each of the engagement grooves 37*k* is recessed outward in the radial direction from the inner peripheral surface 37*a*. Each of the engagement grooves 37*k* is continuously formed at a predetermined angle (for example, approximately 90°) in the circumferential direction around the central axis C2 from an end of each of the guide grooves 37*m* on the second side in the direction of the central axis C2.

Figure 8:
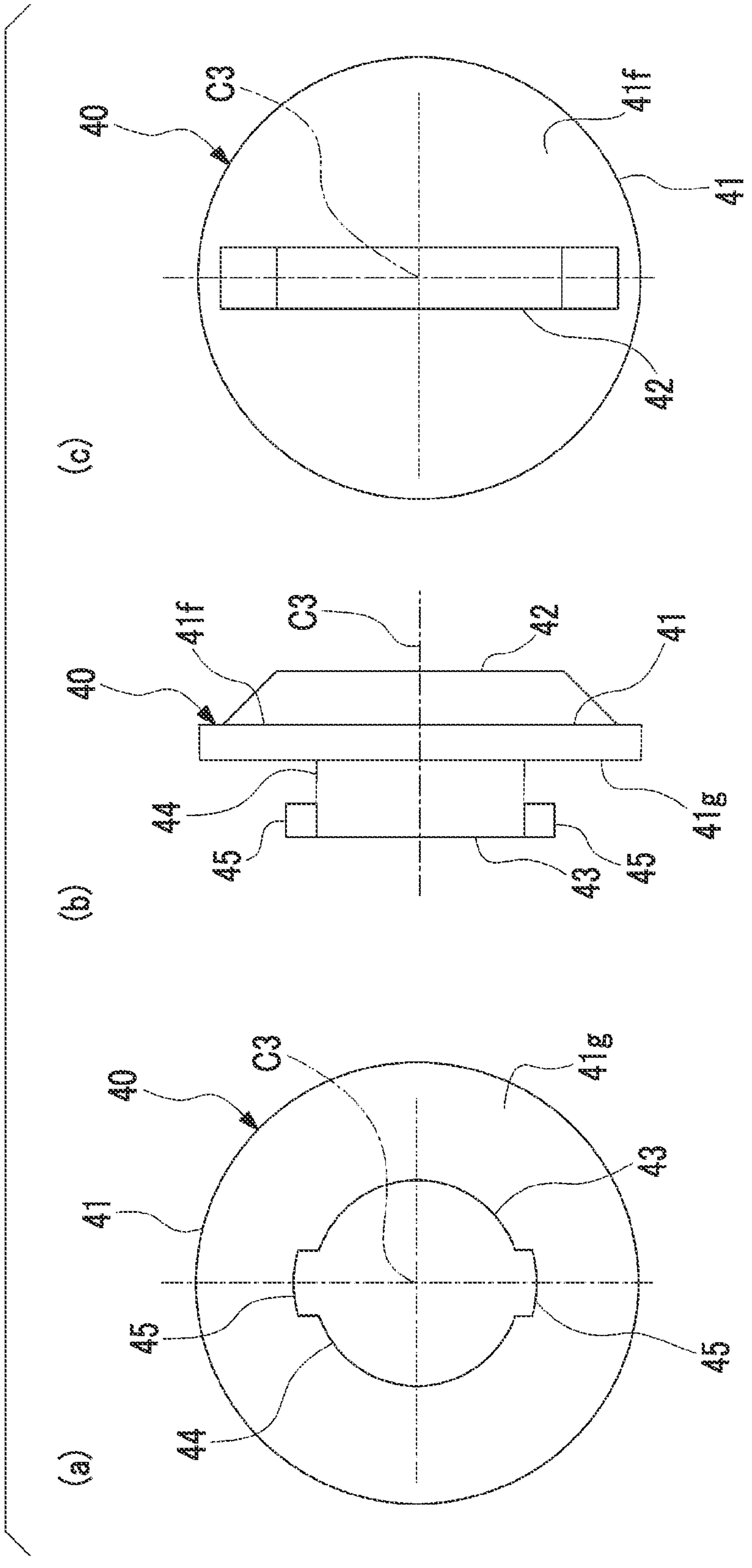
FIG. 8(*a*) is a side view when a pressing member forming the support member of the masking member according to the embodiment is viewed from the first side in the central axis direction, FIG. 8(*b*) is a view when the pressing member is viewed in a direction intersecting with a central axis, and FIG. 8(*c*) is a side view when the pressing member is viewed from the second side in the central axis direction.

FIG. 8(*a*) is a side view when the pressing member forming the support member of the masking member according to the embodiment is viewed from the first side in the central axis direction, FIG. 8(*b*) is a view when the pressing member is viewed in a direction intersecting with the central axis, and FIG. 8(*c*) is a side view when the pressing member is viewed from the second side in the central axis direction.

As illustrated in FIG. 8, the pressing member 40 integrally has a second support plate portion (support surface) 41, a knob portion 42, and an engagement protrusion portion 43. The pressing member 40 is formed of a material harder than that of the sponge 20. For example, the pressing member 40 is formed of a resin material or a rubber material. The pressing member 40 is disposed inside the pipe inner space 2*s* of the vent stringer 2 while a central axis C3 thereof extends along the pipe axis direction Da.

The second support plate portion 41 has a plate shape extending to be orthogonal to the central axis C3. In the present embodiment, the second support plate portion 41 has a circular shape when viewed in a direction of the central axis C3.

The knob portion 42 is erected to the second side in the direction of the central axis C3 from a surface 41*f* on the second side in the direction of the central axis C3 of the second support plate portion 41. The knob portion 42 is continuously formed in the radial direction of the second support plate portion 41 having the circular shape. An operator can rotate the second support plate portion 41 (pressing member 40) around the central axis C3 by gripping the knob portion 42.

The engagement protrusion portion 43 is provided on a surface 41*g* of the second support plate portion 41 on the first side in the direction of the central axis C3. The engagement protrusion portion 43 integrally has a protrusion body 44 and a pair of engagement claws 45.

The protrusion body 44 has a columnar shape extending to the first side in the direction of the central axis C3 from the surface 41*g* of the second support plate portion 41 on the first side in the direction of the central axis C3.

The pair of engagement claws 45 is provided in an end portion of the protrusion body 44 on the first side in the direction of the central axis C3. The pair of engagement claws 45 is provided on both sides in the radial direction while the central axis C3 of the protrusion body 44 is interposed therebetween. Each of the engagement claws 45 protrudes outward in the radial direction from the protrusion body 44.

The pressing member 40 configured in this way is attachable to and detachable from the auxiliary member mounting hole 37 of the main member 31. In order to mount the pressing member 40 on the auxiliary member mounting hole 37, the protrusion body 44 of the engagement protrusion portion 43 is inserted into the auxiliary member mounting hole 37. In this case, the pair of engagement claws 45 is inserted along the pair of guide grooves 37*m* of the auxiliary member mounting hole 37. When the second support plate portion 41 abuts on a tip of the support shaft portion 33 of the main member 31, the pair of engagement claws 45 reaches each of the engagement grooves 37*k* of the auxiliary member mounting hole 37. When an operator grips the knob portion 42 and rotates the pressing member 40 in a first direction around the central axis C3, the pair of engagement claws 45 enters each of the engagement grooves 37*k* from each of the guide grooves 37*m*. In this manner, the pressing member 40 is mounted on the auxiliary member mounting hole 37.

In this state, movement the pressing member 40 is restricted in a direction separated from the auxiliary member mounting hole 37. In addition, the second support plate portion 41 extends along (abuts on) the second supported surface 20*c* of the sponge 20 from the second side in the direction of the central axis C3 (pipe axis direction Da). The second support plate portion 41 extends along the second supported surface 20*c* of the sponge 20. In this manner, movement of the sponge 20 to the second side in the direction of the central axis C3 is restricted.

When the operator grips the knob portion 42 and rotates the pressing member 40 in a second direction around the central axis C3 in order to remove the pressing member 40 from the auxiliary member mounting hole 37, the pair of engagement claws 45 is separated from each of the engagement grooves 37*k*, and enters the guide groove 37*m*. In this state, the pressing member 40 is pulled out to the second side in the direction of the central axis C3. In this manner, the engagement protrusion portion 43 can be pulled out from the auxiliary member mounting hole 37.

Figure 9:
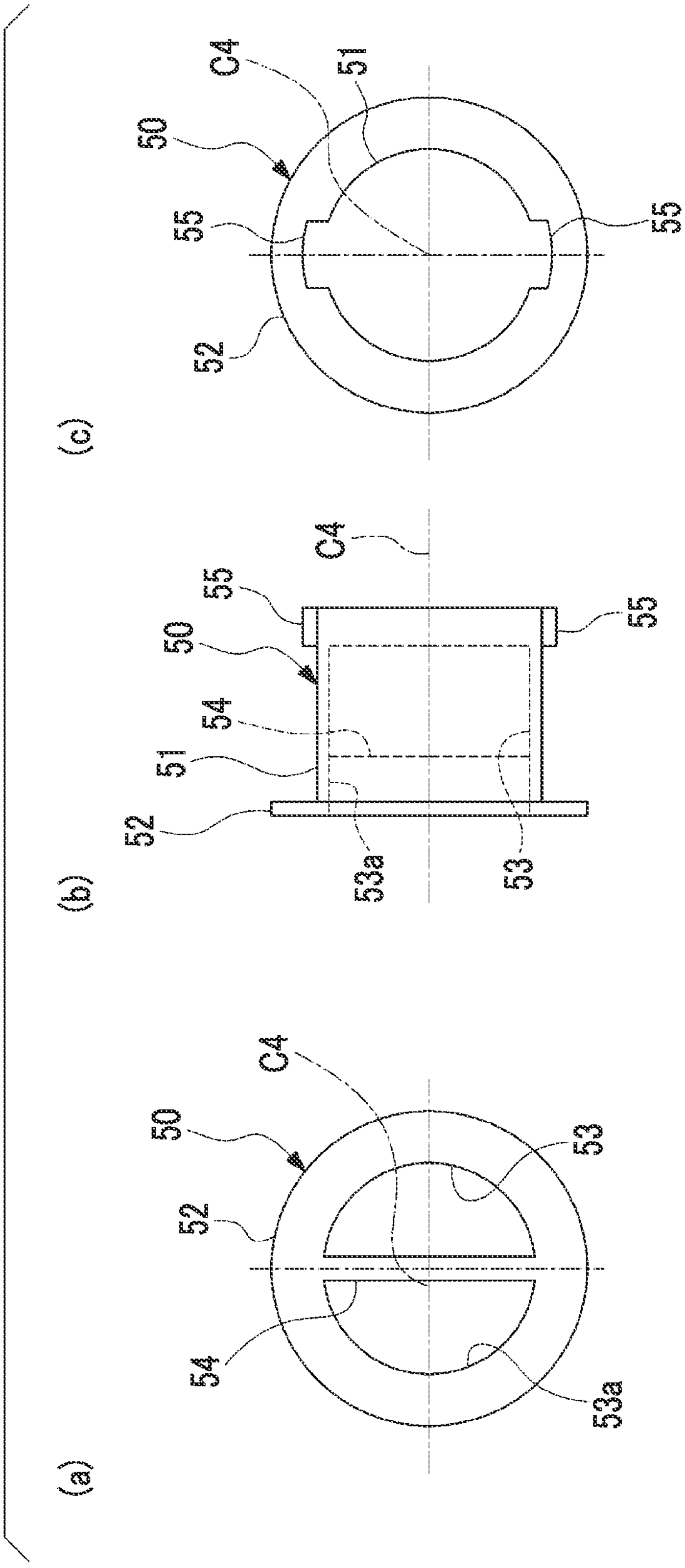
FIG. 9(*a*) is a side view when a grip member forming the support member of the masking member according to the embodiment is viewed from the first side in the central axis direction, FIG. 9(*b*) is a view when the grip member is viewed in the direction intersecting with the central axis, and FIG. 9(*c*) is a side view when the grip member is viewed from the second side in the central axis direction.

FIG. 9(*a*) is a side view when the grip member forming the support member of the masking member according to the embodiment is viewed from the first side in the central axis direction, FIG. 9(*b*) is a view when the grip member is viewed in a direction intersecting with the central axis, and FIG. 9(*c*) is a side view when the grip member is viewed from the second side in the central axis direction.

As illustrated in FIG. 9, the grip member 50 integrally has a cylindrical portion 51, an end plate portion 52, a recessed portion 53, a grip 54, and a pair of engagement claws 55. For example, the grip member 50 is formed of a resin material or a rubber material. As illustrated in FIG. 4, the grip member 50 is mounted on the grip mounting hole 36 of the main member 31 to be attachable and detachable. The grip member 50 is disposed inside the pipe inner space 2*s* of the vent stringer 2 while a central axis C4 thereof extends along the pipe axis direction Da.

The cylindrical portion 51 has a columnar shape extending in a direction of the central axis C4.

The end plate portion 52 is provided in an end portion of the cylindrical portion 51 on the first side (left side in FIG. 9(*b*)) in the direction of the central axis C4. The end plate portion 52 extends outward in the radial direction from the cylindrical portion 51, and is formed in an annular shape continuous in the circumferential direction around the central axis C4.

The recessed portion 53 is recessed to the second side (right side in FIG. 9(*b*)) in the direction of the central axis C4 from an end portion of the grip member 50 of the cylindrical portion 51 on the first side in the direction of the central axis C4. The recessed portion 53 has an opening 53*a* inside in the radial direction of the end plate portion 52 having the annular shape.

The grip 54 is provided in an end portion of the cylindrical portion 51 on the first side in the direction of the central axis C4. The grip 54 extends in the radial direction intersecting with the central axis C4, and is formed across the opening 53*a* of the recessed portion 53. The grip 54 can be gripped by a finger or a hook of the operator.

For example, on the first side of the cylindrical portion 51 in the direction of the central axis C4, the cylindrical portion 51, the end plate portion 52, and the grip 54 are flush with each other.

The pair of engagement claws 55 is provided in an end portion of the cylindrical portion 51 on the second side in the direction of the central axis C4. The pair of engagement claws 55 is provided on both sides in the radial direction while the central axis C4 of the cylindrical portion 51 is interposed therebetween. Each of the engagement claws 55 protrudes outward in the radial direction from the cylindrical portion 51.

As illustrated in FIG. 4, the grip member 50 configured in this way is attachable to and detachable from the grip mounting hole 36 of the main member 31. In order to mount the grip member 50 on the grip mounting hole 36, the cylindrical portion 51 is inserted into the grip mounting hole 36. In this case, the pair of engagement claws 55 is inserted along the pair of guide grooves 36*m* of the grip mounting hole 36. When the end plate portion 52 abuts on the first support plate portion 34 of the main member 31, the pair of engagement claws 55 reaches each of the engagement grooves 36*k* of the grip mounting hole 36. When the operator grips the grip 54 and rotates the grip member 50 in the first direction around the central axis C4, the pair of engagement claws 55 enters each of the engagement grooves 36*k* from each of the guide grooves 36*m*. In this manner, the grip member 50 is mounted on the grip mounting hole 36.

In this state, movement of the grip member 50 is restricted in the direction separated from the grip mounting hole 36.

When the operator grips the grip 54 and rotates the grip member 50 in a second direction around the central axis C4 in order to remove the grip member 50 from the grip mounting hole 36, the pair of engagement claws 55 is separated from each of the engagement grooves 36*k*, and enters the guide groove 36*m*. In this state, the grip member 50 is pulled out to the first side in the direction of the central axis C4. In this manner, the grip member 50 can be pulled out from the grip mounting hole 36.

The masking member 10 as described above is used in a state where the sponge 20 is mounted on the support member 30. The support member 30 is used in a state where the pressing member 40 is mounted on the auxiliary member mounting hole 37 of the main member 31 and the grip member 50 is mounted on the grip mounting hole 36.

Hereinafter, a method for coating the pipe inner peripheral surface *2f* by using the masking member 10 will be described.

Figure 10:
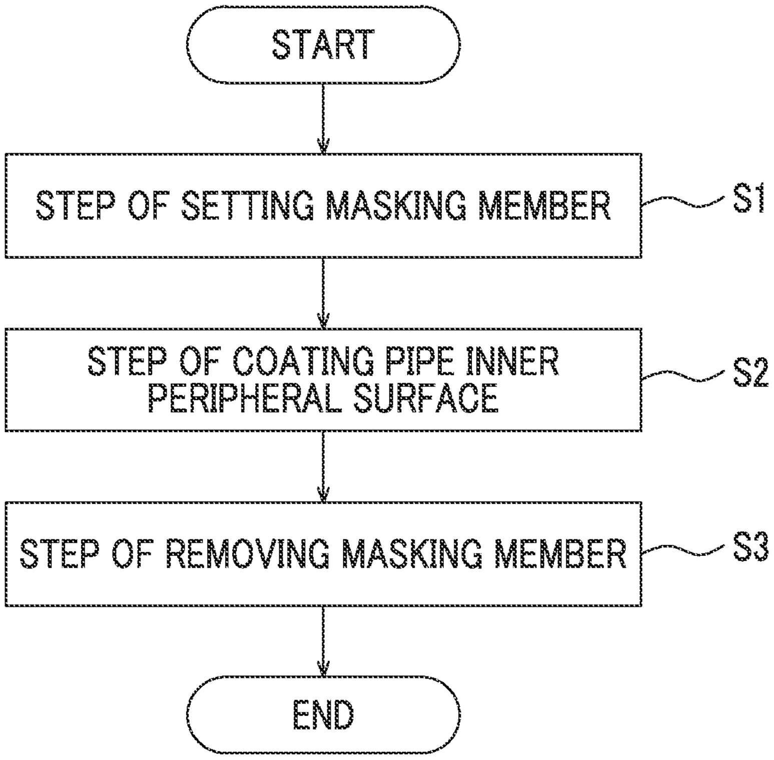
FIG. 10 is a flowchart illustrating a flow of a method for coating a pipe inner peripheral surface according to an embodiment.
Figure 11:
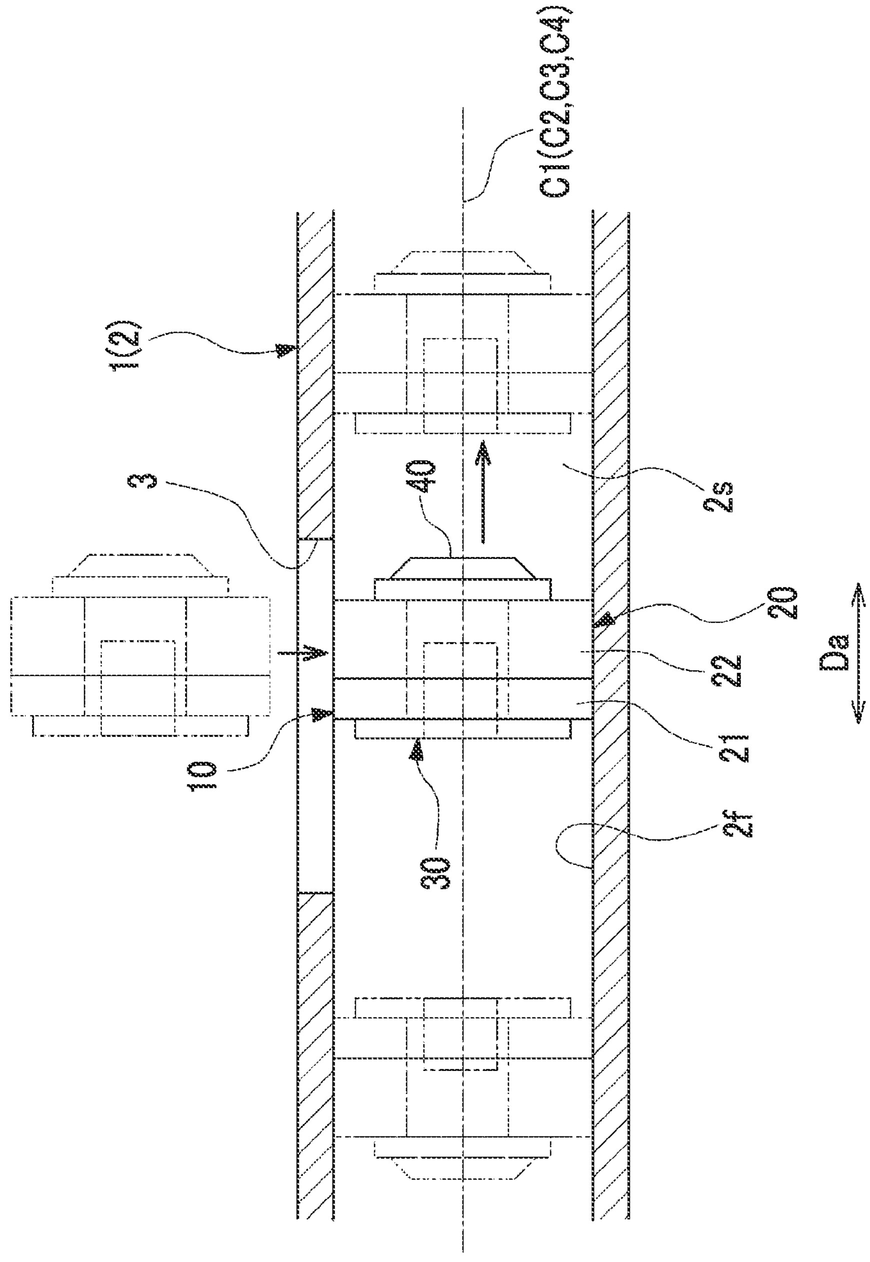
FIG. 11 is a sectional view illustrating a state where the masking member is inserted into the pipe inner space from an opening in the method for coating the pipe inner peripheral surface according to the embodiment.
Figure 12:
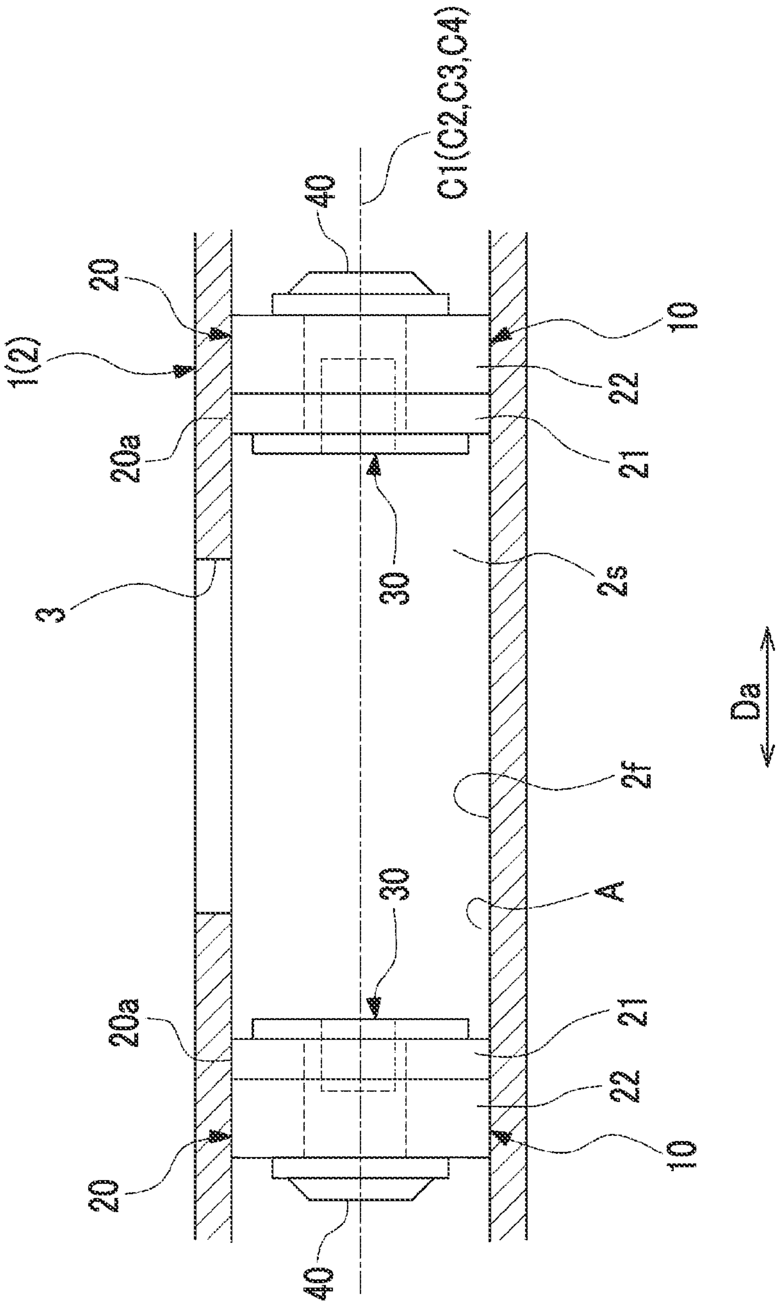
FIG. 12 is a sectional view illustrating a state where the masking member is disposed at a predetermined position of the pipe inner space in the method for coating the pipe inner peripheral surface according to the embodiment.

FIG. 10 is a flowchart illustrating a flow of the method for coating the pipe inner peripheral surface according to the present embodiment. FIG. 11 is a sectional view illustrating a state where the masking member is inserted into the pipe inner space through the opening in the method for coating the pipe inner peripheral surface according to the present embodiment. FIG. 12 is a sectional view illustrating a state where the masking member is disposed at a predetermined position in the pipe inner space in the method for coating the pipe inner peripheral surface according to the present embodiment.

As illustrated in FIG. 10, the method for coating the pipe inner peripheral surface 2*f* by using the masking member 10 in the present embodiment includes Step S1 of setting the masking member 10, Step S2 of coating the pipe inner peripheral surface 2*f*, and Step S3 of removing the masking member 10.

In Step S1, each of the masking members 10 is set on both sides of the region A in the pipe axis direction Da inside the vent stringer 2. The masking member 10 is provided at a position separated from the opening 3 of the vent stringer 2 by a dimension determined in the pipe axis direction Da of the vent stringer 2. In the present embodiment, as illustrated in FIG. 11, each of the masking members 10 is inserted into the pipe inner space 2*s* of the vent stringer 2 through the opening 3. In this case, in the masking member 10, the second sponge layer 22 having meshes coarser than those of the first sponge layer 21 in the sponge 20 is set to face forward in a moving direction of the masking member 10 in the pipe inner space 2*s*. The operator grips the grip 54 with a finger or a hook, so that each of the masking members 10 is moved in the pipe inner space 2*s* in the pipe axis direction Da from the opening 3. A portion of the outer peripheral surface 20*a* of the sponge 20 is the second sponge layer 22 having the coarse meshes. Accordingly, frictional resistance between the sponge 20 and the pipe inner peripheral surface 2*f* is reduced, and the sponge 20 can be easily moved in the pipe inner space 2*s*.

As illustrated in FIG. 12, when each of the masking members 10 reaches a position separated from the opening 3 by the dimension determined in the pipe axis direction Da, the masking member 10 is left behind in the pipe inner space 2*s*. In this state, the outer peripheral surface 20*a* of the sponge 20 of the masking member 10 comes into contact with the pipe inner peripheral surface 2*f* over the entire periphery in the circumferential direction. In this case, when the sponge 20 is compressed inward in the radial direction from the pipe inner peripheral surface 2*f*, the outer peripheral surface 20*a* of the sponge 20 comes into close contact with the pipe inner peripheral surface 2*f*. In addition, in each of the masking members, 10 on one side facing the region A serving as a coating object in the pipe axis direction Da, the first sponge layer 21 having meshes finer than those of the second sponge layer 22 is disposed in the sponge 20.

In this way, the first sponge layer 21 having the finer meshes is brought into contact with the pipe inner peripheral surface 2*f*. Accordingly, it is possible to suppress a possibility that the coating material may pass through micropores of the first sponge layer 21.

In addition, the first sponge layer 21 having the finer meshes is disposed on a coating side with respect to the second sponge layer 22. Accordingly, absorption of the coating material is improved. Therefore, the masking member 10 can suppress unevenness in a boundary between the coating portion P and the non-coating portion Np, and can suppress dust of the coating material after the coating material is dried.

In this way, after the masking members 10 is disposed at a predetermined position on both sides of the region A in the pipe axis direction Da, the process proceeds to Step S2.

In Step S2, the pipe inner peripheral surface 2*f* is coated from the opening 3. For this purpose, a coating material spraying gun (not illustrated) for spraying a predetermined coating material is inserted into the pipe inner space 2*s* from the opening 3, and the pipe inner peripheral surface 2*f* in the predetermined region A is coated. In this manner, as illustrated in FIG. 2, the coating portion P in which the pipe inner peripheral surface 2*f* in the region A is coated is formed on one side which is the opening 3 side with respect to the masking member 10 in the pipe axis direction Da. In addition, due to the masking member 10, the coating material does not reach the other side which is a side away from the opening 3 with respect to the masking member 10 in the pipe axis direction Da, and the non-coating portion Np which is not coated is formed on the other side.

In Step S3, for example, when the coating material of the coating portion P is dried to such an extent that the coating material does not adhere to the finger of the operator even if the operator touches the coating material, each of the masking members 10 is removed from the opening 3 of the vent stringer 2. For this purpose, the operator grips the grip 54 with a finger or a hook so that each of the masking members 10 is moved to the opening 3 side in the pipe inner space 2*s* along the pipe axis direction Da. Even in this case, a portion of the outer peripheral surface 20*a* of the sponge 20 is the second sponge layer 22 having the coarse meshes. Accordingly, the frictional resistance between the sponge 20 and the pipe inner peripheral surface 2*f* is reduced, and the sponge 20 can be easily moved in the pipe inner space 2*s*. When each of the masking members 10 is removed from the opening 3 and the coating material of the coating portion P is dried, the pipe inner peripheral surface 2*f* is completely coated.

The masking member 10 in the present embodiment closes the pipe inner space 2*s* of the vent stringer 2 with the masking member 10 including the sponge 20 and the support member 30. In this manner, when the pipe inner peripheral surface 2*f* is coated from one side of the vent stringer 2 in the pipe axis direction Da with respect to the masking member 10, it is possible to suppress a possibility that the coating material may reach the other side in the pipe axis direction Da. In this manner, the coating portion P which is coated is formed on one side in the pipe axis direction Da with respect to the masking member 10, and the non-coating portion Np which is not coated is formed on the other side in the pipe axis direction Da.

In addition, the sponge 20 comes into contact with the pipe inner peripheral surface 2*f*. Accordingly, the frictional resistance generated between the masking member 10 and the pipe inner peripheral surface 2*f* decreases.

Therefore, the masking member 10 can be easily moved in the pipe axis direction Da inside the vent stringer 2.

Therefore, the masking member 10 can be easily inserted into the hollow pipe.

In addition, the sponge 20 includes the first sponge layer 21 and the second sponge layer 22 having meshes coarser than those of the first sponge layer 21 sequentially from a side closer to the coating portion P in the pipe axis direction Da of the vent stringer 2. The second sponge layer 22 having the coarse meshes is provided in this way. In this manner, the frictional resistance against the pipe inner peripheral surface 2*f* can be further suppressed.

In addition, the first sponge layer 21 having meshes finer than those of the second sponge layer 22 is brought into contact with the pipe inner peripheral surface 2*f*. In this manner, reliable masking is performed by suppressing a possibility that the coating material may pass through micropores of the first sponge layer 21.

In addition, the first sponge layer 21 having the finer meshes is disposed on a coating side with respect to the second sponge layer 22. Accordingly, absorption of the coating material is improved. Therefore, the masking member 10 can suppress unevenness in a boundary between the coating portion P and the non-coating portion Np, and can suppress dust of the coating material after the coating material is dried.

In addition, the outer peripheral surface 20*a* of the sponge 20 can come into contact with the pipe inner peripheral surface 2*f* over the entire periphery. In this manner, a gap between the masking member 10 and the pipe inner peripheral surface 2*f* can be reliably closed, and more reliable masking can be performed.

In addition, the outer peripheral surface 20*a* of the sponge 20 is parallel to the pipe inner peripheral surface 2*f*. Therefore, the sponge 20 and the pipe inner peripheral surface 2*f* come into contact with each other over a constant length along the pipe axis direction Da. In this manner, more reliable masking can be performed.

In addition, the sponge 20 is attachable to and detachable from the support member 30. Therefore, the masking member 10 can be repeatedly used by replacing the sponge 20.

In addition, the sponge 20 has the supported surfaces 20*b* and 20*c* which face the pipe axis direction Da of the vent stringer 2, and the support member 30 has the first support plate portion 34 facing the supported surfaces 20*b* and 20*c* in the pipe axis direction Da, and the second support plate portion 41. Therefore, when the masking member 10 is inserted into and removed from the vent stringer 2, it is possible to suppress a possibility that the sponge 20 may deviate from the support member 30 in the pipe axis direction Da.

In addition, the sponge 20 has the through-hole 20*h* penetrating in the pipe axis direction Da. The support member 30 includes the support shaft portion 33 inserted into the through-hole 20*h* of the sponge 20, the first support plate portion 34 provided on one end side of the support shaft portion 33 in the pipe axis direction Da, and extending along the first supported surface 20*b* facing the first side of the sponge 20 in the pipe axis direction Da, and the second support plate portion 41 provided on the other end side of the support shaft portion 33 in the pipe axis direction Da, and extending along the second supported surface 20*c* facing the second side of the sponge 20 in the pipe axis direction Da. In this configuration, movement of the sponge 20 in the radial direction of the vent stringer 2 is restricted by the support shaft portion 33 inserted into the through-hole 20*h*. In addition, the sponge 20 is pinched between the first support plate portion 34 and the second support plate portion 41. In this manner, the movement in the pipe axis direction Da is restricted. In this way, the support member 30 can reliably hold the sponge 20.

In addition, the pressing member 40 having the second support plate portion 41 is attachable to and detachable from the support shaft portion 33. Therefore, the sponge can be easily attached and detached by removing the second support plate portion 41 from the support shaft portion 33.

In addition, the support member 30 further includes the attachable and detachable grip member 50. Therefore, since the grip member 50 is provided, the masking member 10 can be easily installed in and removed from the vent stringer 2. In addition, the grip member 50 is attachable and detachable. Accordingly, when the grip member 50 becomes dirty with the coating material, or when the grip member 50 is less likely to be gripped due to accumulated coating of the coating material, only the grip member 50 can be replaced.

In the example of the above-described embodiment, the cylindrical portion 51, the end plate portion 52, and the grip 54 are flush with each other on the first side of the cylindrical portion 51 in the direction of the central axis C4.

As a comparative example, when a masking member having a grip protruding in the central axis direction is used, in some cases, the grip may come into contact with the coating material spraying gun during coating work, or the masking member may be tilted due to the own weight of the grip, and the grip may come into contact with the pipe inner peripheral surface.

In contrast, when the cylindrical portion 51, the end plate portion 52, and the grip 54 are flush with each other on the first side of the cylindrical portion 51 in the direction of the central axis C4, the grip is less likely to come into contact with the coating material spraying gun during the coating work, or the masking member is less likely to be tilted due to the own weight of the grip.

In addition, the method for coating the pipe inner peripheral surface 2*f* in the present embodiment includes Step S1 of providing the masking member 10 at the position separated from the opening 3 of the vent stringer 2 by the dimension determined in the pipe axis direction Da of the vent stringer 2, Step S2 of coating the pipe inner peripheral surface 2*f* from the opening 3, and Step S3 of removing the masking member 10 from the opening 3 of the vent stringer 2. According to this configuration, in a state where the masking member 10 is installed inside the vent stringer 2, the pipe inner peripheral surface 2*f* is coated from the opening 3 side of the vent stringer 2. In this manner, only the pipe inner peripheral surface 2*f* on the opening 3 side with respect to the masking member 10 can be coated. In addition, in the masking member 10, the sponge 20 comes into contact with the pipe inner peripheral surface 2*f*. Accordingly, the masking member 10 can be easily moved inside the vent stringer 2 in the pipe axis direction Da.

Therefore, the masking member 10 can be easily inserted into the hollow pipe.

In the above-described embodiment, the sectional shape of the sponge 20 is the trapezoidal shape. However, the sponge 20 may have a shape corresponding to the sectional shape of the pipe inner space 2*s* serving as the coating object.

In addition, in the above-described embodiment, the region A extending to both sides in the pipe axis direction Da around the opening 3 is coated. However, the configuration is not limited thereto. For example, the above-described masking member 10 can be used even when a predetermined region is coated along the pipe axis direction from the opening in the end portion of the hollow pipe. In this case, only one masking member 10 is used, and the masking member 10 is disposed at a position having a predetermined dimension in the pipe axis direction from the opening in the end portion of the hollow pipe.

In addition, in the above-described embodiment, the sponge 20 is brought into contact with the pipe inner peripheral surface 2*f* over the entire periphery in the circumferential direction. However, the configuration is not limited thereto. The support member 30 may be exposed on the outer peripheral surface of the masking member 10 in a portion of the masking member 10 in the circumferential direction.

In addition, in the above-described embodiment, the support shaft portion 33 and the through-hole 20*h* of the sponge 20 have the pentagonal shape. However, as long as the sponge 20 can be restricted not to be rotated in the circumferential direction with respect to the support shaft portion 33, the shape or the configuration can be appropriately changed.

Alternatively, a shape or a configuration of each portion of the masking member 10 can be appropriately changed as long as required functions can be achieved.

Each member of the sponge 20 or the support member 30 may be formed of a metallic material.

However, when there is a possibility of damage to the vent stringer 2, it is desirable that the sponge 20 is formed of a resin material rather than the metallic material, and it is desirable that each member of the support member 30 is formed of the resin material or a rubber material rather than the metallic material.

In the example of the present embodiment, each member of the support member 30 is molded by a 3D printer. However, each member may be molded by means of compression molding or injection molding.

Hitherto, the embodiments of the present invention have been described. However, the embodiments have been described as examples, and do not intend to limit the scope of the invention. The embodiments can be implemented in various other forms, and various omissions, substitutions, and modifications can be made within the scope not departing from the concept of the invention. The embodiments or modifications thereof are included in the scope and the concept of the invention, and are also included in the scope of the invention described in the appended claims and an equivalent scope thereof.

INDUSTRIAL APPLICABILITY

According to the above-described aspect, the masking member is likely to be inserted into the hollow pipe.

REFERENCE SIGNS LIST

1: Coating object
2: Vent stringer (hollow pipe)
2*f*: Pipe inner peripheral surface
2*s*: Pipe inner space
3: Opening
10: Masking member
20: Sponge
20*a*: Outer peripheral surface
20*b*: First supported surface (supported surface)
20*c*: Second supported surface (supported surface)
20*h*: Through-hole
21: First sponge layer
22: Second sponge layer
30: Support member
31: Main member
31*w*: Partition wall
33: Support shaft portion
33*a*: One end
33*b*: Other end
34: First support plate portion (support surface)
36: Grip mounting hole
36*a*: Inner peripheral surface
36*b*: Bottom portion
36*k*: Engagement groove
36*m*: Guide groove
37: Auxiliary member mounting hole
37*a*: Inner peripheral surface
37*b*: Bottom portion
37*k*: Engagement groove
37*m*: Guide groove
40: Pressing member
41: Second support plate portion (support surface)
41*f*: Surface
41*g*: Surface
42: Knob portion
43: Engagement protrusion portion
44: Protrusion body
45: Engagement claw
50: Grip member
51: Cylindrical portion
52: End plate portion
53: Recessed portion
53*a*: Opening portion
54: Grip
55: Engagement claw
A: Region
C1, C2, C3, C4: Central axis
Da: Pipe axis direction
Np: Non-coating portion
P: Coating portion

The invention claimed is:

1. A masking member used to coat a pipe inner peripheral surface of a hollow pipe, comprising:
a sponge that closes a pipe inner space of the hollow pipe, and has an outer peripheral surface which comes into contact with the pipe inner peripheral surface; and
a support member that supports the sponge,
wherein the sponge includes a first sponge layer and a second sponge layer having meshes coarser than those of the first sponge layer sequentially from a side closer to a coating portion in a pipe axis direction of the hollow pipe.

2. The masking member according to claim 1,
wherein the outer peripheral surface of the sponge comes into contact with the pipe inner peripheral surface over an entire periphery.

3. The masking member according to claim 1,
wherein the outer peripheral surface of the sponge is parallel to the pipe inner peripheral surface.

4. The masking member according to claim 1,
wherein the sponge is attachable to and detachable from the support member.

5. The masking member according to claim 1, wherein the sponge has a supported surface facing the pipe axis direction, and the support member has a support surface facing the supported surface in the pipe axis direction.

6. The masking member according to claim 5,
wherein the sponge has a through-hole penetrating in the pipe axis direction, and
the support member includes
a support shaft portion inserted into the through-hole of the sponge,
a first support plate portion provided on one end side of the support shaft portion in the pipe axis direction, and formed along a first supported surface of the sponge which faces a first side in the pipe axis direction, and
a second support plate portion provided on the other end side of the support shaft portion in the pipe axis direction, and formed along a second supported surface of the sponge which faces a second side in the pipe axis direction.

7. The masking member according to claim 6, wherein the second support plate portion is attachable to and detachable from the support shaft portion.

8. The masking member according to claim 1, wherein the support member further includes an attachable and detachable grip.

9. A method for coating the pipe inner peripheral surface by using the masking member according to claim 1, the method comprising:

a step of providing the masking member at a position separated from an opening of the hollow pipe by a determined dimension in the pipe axis direction;

a step of coating the pipe inner peripheral surface from the opening; and a step of removing the masking member from the opening of the hollow pipe.

* * * * *